Aug. 23, 1949.  W. MORTON ET AL  2,479,764
TRANSMISSION GOVERNOR
Filed March 18, 1946  3 Sheets-Sheet 1
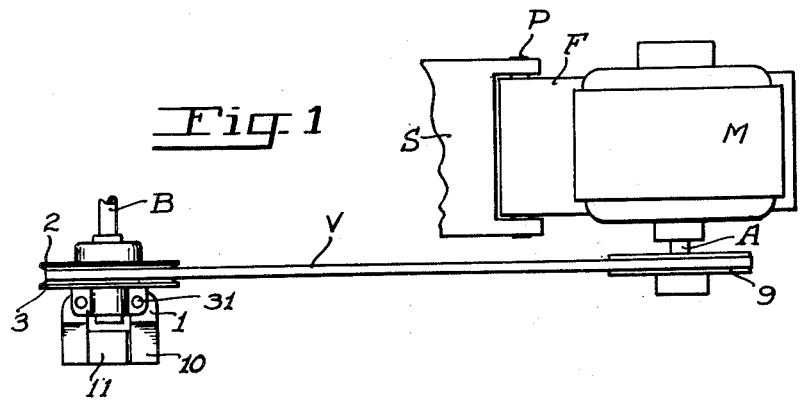
Fig. 1
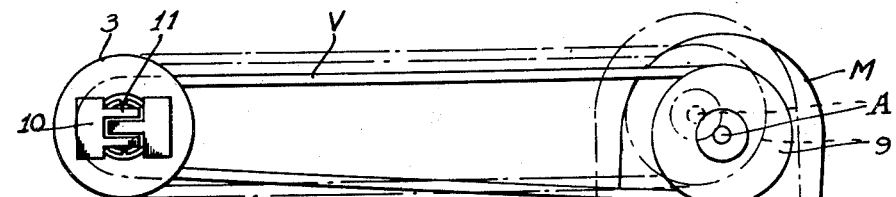
Fig. 2
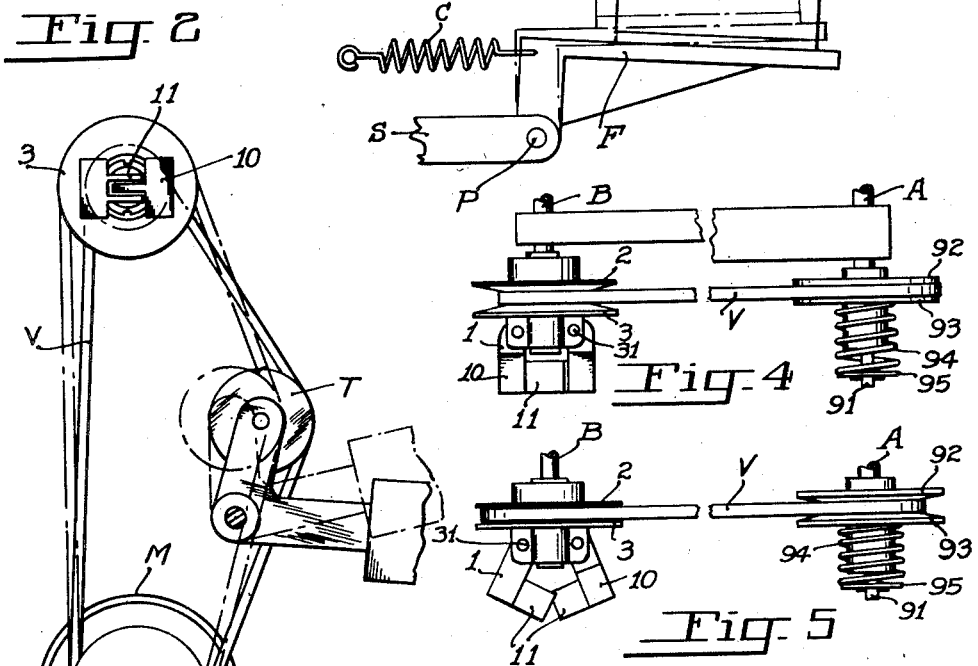
Fig. 3
Fig. 4
Fig. 5
INVENTOR.
WILLIAM MORTON
BY ROBERT W. HERMANSON
Reynolds Beach
ATTORNEYS

INVENTOR.
WILLIAM MORTON
BY ROBERT W. HERMANSON

ATTORNEYS

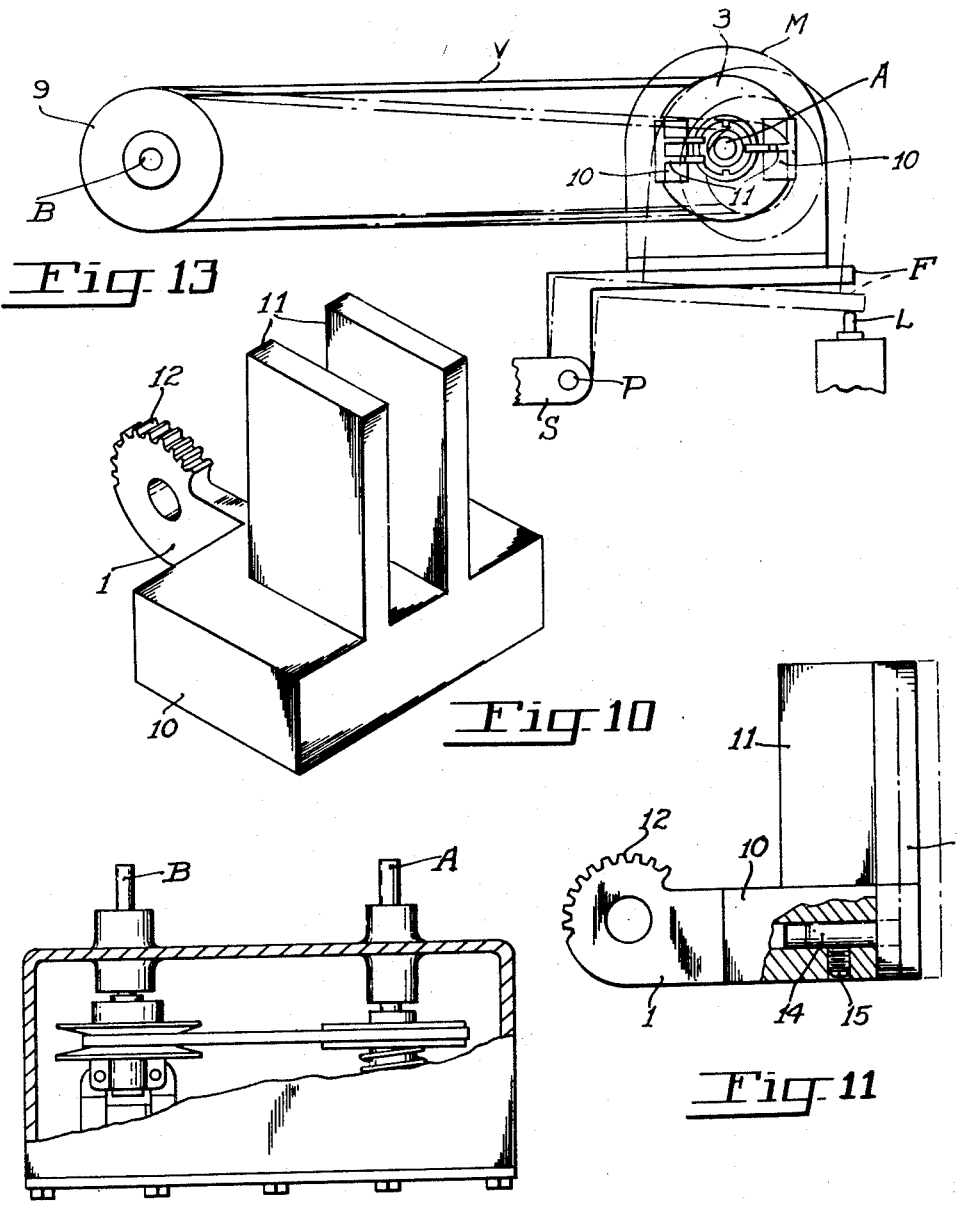

Patented Aug. 23, 1949

2,479,764

UNITED STATES PATENT OFFICE 2,479,764

TRANSMISSION GOVERNOR

William Morton and Robert W. Hermanson, Seattle, Wash.

Application March 18, 1946, Serial No. 655,328

6 Claims. (Cl. 264—15)

Flyball governors, which is the general type herein disclosed, have been used heretofore for the purpose of maintaining more or less constant the rotative speed of that shaft whereon the governor is mounted. While the governor of this invention is useful to that end, it has been devised primarily as a means of effecting proper transmission of power between two shafts, a driving and a driven shaft, and proper regulation of their relative speeds. In one form of arrangement, wherein the governor is mounted upon the driven shaft, the latter may be maintained automatically at a nearly constant speed for any given load, regardless of variations in the speed of the driving shaft over a wide range. Conversely, arranged with the governor upon the driving shaft, the latter may be permitted to attain a minimum operative speed before the load is applied to it, and thereafter the driving torque will be applied so smoothly to the load, and at such favorable mechanical advantage, that the driving shaft is not slowed down below such minimum operative speed, but may in fact increase its speed to and maintain it at the designed optimum speed, and that speed may be maintained thereafter regardless of load variations; thus the likelihood of stalling the driving motor or engine is virtually eliminated, and power is always applied to the load at the best mechanical advantage, having regard to the relative speeds of the two shafts.

The particular structure of the governor renders it peculiarly adaptable to the uses indicated, and the invention resides therefore, in the transmissions including such governor, as well as in the governor as a subcombination particularly suited to such uses, or useful in its own right as a governor of general application, all as herein shown, described, and claimed.

To illustrate the purpose and advantage of the first arrangement, take an automobile, for example, wherein the engine shaft's speed varies widely and frequently, but the generator's speed should remain constant. By such a governor, on the generator shaft, and by driving the latter under control of such governor from the engine shaft, the generator may continue to rotate at a substantially constant speed, notwithstanding the variations in the engine speed. Proper maintenance of the speed relations, however, is only possible with this particular governor, in the arrangement mentioned. On the other hand, in an installation such as a constant-speed electric motor connected to a load, a compressor for example, it is difficult for the motor, starting under load, to acquire sufficient speed to reach its necessary minimum speed, or to maintain such speed after the load is applied, or as the load varies. By such a governor, on the motor shaft, and controlling the transmission of power to a load shaft, torque can be most favorably applied to the load, to permit the motor first to attain its minimum speed, and then to apply the load slowly, and by least impeding the pick-up of speed by the motor shaft, to avoid stalling of the latter; the load can thus be driven under automatically selected conditions of most favorable mechanical advantage. This can only be done with this particular governor, arranged as indicated.

The characteristic which enables the governor to function as indicated is its sensitivity of control at its intended speed, resulting from its reluctance to effect control movement of the governor arms until the predetermined speed has been attained, and thereupon the rapid outswinging of the governor arms to operative position, through an angle somewhat greater than in a normal governor, while still retaining the capacity to produce a residual axial thrust, and thus to follow promptly any tendency to change the rotative speed. Whereas in the ordinary flyball governor, at a comparatively low speed its flyballs approach their maximum outwardly swung disposition, and further outward swing occurs only to a small extent and with a disproportionate increase of speed, so that its operative control is relatively unsensitive, the present governor inherently and to a much greater degree resists departure from its position of rest, develops a further or residual thrust-producing force after appreciable departure from such position, and moves rapidly through a materially greater angle of departure, so that while its operative range is narrow and control is sharp, its sensitivity is materially greater. Moreover, in operative position it still retains a residual thrust-producing force, effective to counteract opposing forces. Thus it affords the capability of control to a much greater degree, through a wide control range of relative shaft speeds, and with much greater sensitivity at all such relative speeds, when controlling the driving interconnection between two such shafts, than is the case with any other governor. Hence, the invention comprises, in its general sense, a transmission of material sensitivity and range, automatically controllable by means of a special governor so peculiarly suited for control in this manner and in such a combination as to become a true element in the combination.

The general objects of the invention have been indicated above.

A particular object is to produce such sensitivity in a flyball governor by providing it in effect with two weight masses, maintained at different distances from the rotative axis, so that at the outset of their centrifugally induced movement, the outer weights govern movement of the governor in the normal manner, yet as the governor arms swing rapidly outward the control function is taken over by the inner weights, which only then have been moved appreciably outwardly from the rotative axis, and which therefore have an appreciable possible further outward movement without application of excessive centrifugal force, and which thus retain a residual operative axial thrust.

It is also an object to provide such a governor which is of simple construction and capable of wide changes in design, or of adjustment, according to the particular conditions to be met.

It is believed that sufficient has been said to indicate the general nature and objects of the invention, and that further understanding of the invention can best be acquired from a study of the attached drawings, wherein the invention is shown in various typical embodiments, and of the following specification and claims, wherein the principles of the invention are disclosed and its limits defined.

Figure 1 is a plan view and Figure 2 is a side elevational view illustrating one embodiment of the invention in a transmission, and Figure 3 is a side elevation illustrating a somewhat different embodiment.

Figures 4 and 5 are plan views showing parts somewhat differently arranged, the first in a position of rest, and the second, for comparison, in a typical rotative position.

Figure 10 is an isometric detail, greatly enlarged in size, of one of the flyball members and its supporting arm, and Figure 11 is a side elevation, partly in section, of a modified arrangement, illustrating its adaptability to adjustment.

Figure 12 is a plan view, with casing parts broken away, illustrating a transmission arrangement capable of manufacture as a unit for installation between any driving and driven element.

Figure 13 is a side elevation similar to Figure 2, illustrating an arrangement which is the opposite of that shown in Figures 1, 2, and 3.

Figures 6, 7:
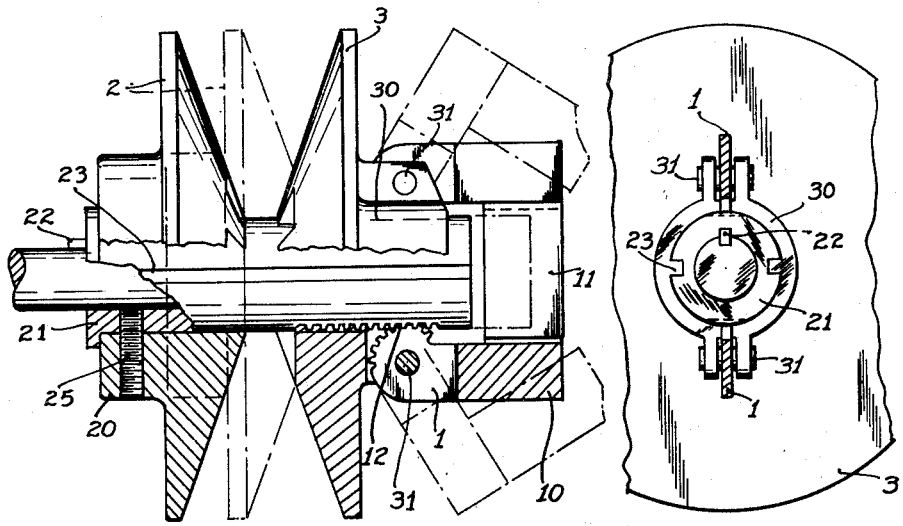
Figure 6 is in part a side elevation and in part an axial section illustrating in enlarged size the details of the governor and its mounting.
Figure 7 is an end view thereof, the governor arms being shown in section.

In the normal ball governor, the flyballs in position of rest are necessarily spaced somewhat outwardly from their rotative axis, and immediately any appreciable rotative speed is attained, even though materially below the intended control range, the balls quickly move out to such angular position, or to such extent, that even a very appreciable further increase in rotative speed produces but slight additional movement of the governor arms. The result is that the control range is narrow and, because there remains no residual effective thrust, the governor's sensitivity thereafter is not high. Customarily its action is amplified mechanically to afford greater sensitivity.

By comparison, the flyballs of the governor of this invention are so constructed and arranged as to have, in effect, two weight masses, one of which corresponds to the weight mass of the normal governor, and which, being located somewhat outwardly from the rotative axis in position of rest, swings outwardly from that axis when its centrifugal effect counteracts the resisting force, soon reaching or approaching closely what would be its outwardly swung limit were the other weight mass omitted. The second weight mass, which in position of rest is located in, near, or even at the opposite side of the rotative axis from the first weight mass, and which is preferably held in rigid disposition relative to such first weight mass and to the governor arm, swings outwardly as the first weight mass swings outwardly. In the initial stages of such outward swing the second weight mass, being appreciably nearer the rotative axis, exerts but slight effect on the first weight mass, or on the governor as a whole. Nevertheless, by the time the first weight mass has approached or attained that outwardly swung position which would constitute its final position, were the secondary weight mass omitted, the secondary weight mass has swung sufficiently outwardly that now it exerts a material effect upon the governor arm, and tends now to swing it farther outwardly. Still, the secondary weight mass has not swung outwardly as far as it would swing, were the first weight mass omitted. In consequence, the secondary weight mass now tends to assume the control of the governor, and to swing further outwardly. As the first weight mass, approaching a position at 90° to the shaft from the fulcrum of the governor arm and having acquired an unfavorable leverage disposition, progressively loses its capability of effecting further control movement, the secondary weight mass, having reached only a position at, say, 75° to the shaft, increases materially its capability of effecting control movement, and may, indeed, assume the entire control function. Since in this partly outswung position the secondary weight mass tends to swing farther outward, it produces a material residual axial thrust, available for sensitive control over a wide range. The governor arm may swing through more than 90°, and the combined effect of such multiple weight masses, so arranged, and producing opposed forces, is to afford extremely sensitive control over a wide range of relative shaft speeds.

These results may be varied by means such as design changes in the relative mass of the two weight masses, or in their relative disposition with relation to the rotative axis or along such axis, or by adjustment of one in some such manner, with relation to the other. While two such cooperative weight masses will ordinarily be sufficient for all practical purposes, it is not outside the invention to employ more than two, each arranged so that in turn it will swing into position to exert a material effect on the governor as a whole.

A typical installation, to maintain constant speed in a driven shaft, notwithstanding variations in the speed of the driving shaft, is shown in Figures 1 and 2. Here it may be considered that the shaft A is a driving shaft, and the shaft B is a driven shaft; the shaft A forms the shaft of a motor M mounted upon a base F pivoted at P to a fixed support S. The shafts A and B are connected by a V-belt V running over V-belt pulleys on the respective shafts. The weight of the motor and its base to maintain the belt V tight, may be counter-acted to any necessary degree by the counter-weighting spring C.

In this particular installation the pulley 9 upon the shaft A is a solid pulley, whereas the pulley upon the driven shaft B is formed of two axially separable but conjointly rotative parts 2 and 3, cooperatively coned on their inner faces so that as they separate, the belt V may ride closer to the rotative axis, and when they are caused to approach, the belt will bear at a greater radial distance from the rotative axis. The control of such movement is under the influence of the special governor means referred to above.

Such a governor is shown in detail in Figure 6. The pulley half 2 with its hub 20 is secured to the sleeve 21, and both are held against movement lengthwise of the shaft by the set screw 25. A key 22 prevents rotation of the sleeve 21, and hence of the pulley half 2, relative to the shaft. Keyed by a key within the groove 23 to rotate with, but slidable axially relative to, the sleeve 21 is the hub 30 of the other pulley half 3. The pulley half 2, then, rotates with and may not move axially relative to the shaft, whereas the pulley half 3 rotates also with the shaft, but is movable axially along the shaft, in effect.

Fulcrumed at 31 upon the hub 30, are flyball arms 1 carrying primary weight masses or balls 10 at or adjacent their swinging ends. These arms 1 are connected, as by the rack teeth at 1ˣ, to meshing rack teeth upon the sleeve 21. As the governor arms 1 swing outwardly from their position of rest, shown in full lines in Figure 6, towards their outwardly swung operative position, shown in dot-dash lines in that figure, they effect approach of the two oppositely coned halves 2 and 3, and vice versa. Approach of these halves, as has already been indicated, increases the effective bearing radius of the pulley, and shifts the bearing circle of the belt V outwardly upon the composite pulley 2, 3.

The governor arms 1, however, have an additional or secondary weight mass, created by angling inwardly their outer termini to provide masses 11 which are directed inwardly toward, and preferably at least to or beyond the rotative axis. These supplemental masses 11 are best shown in Figure 5 or in Figure 10. In the arrangement illustrated, the supplemental masses on one governor arm of a symmetrically disposed pair are split to overlap and extend beyond the lapping end of the supplemental weight mass upon the second arm of the pair.

Figures 8, 9:
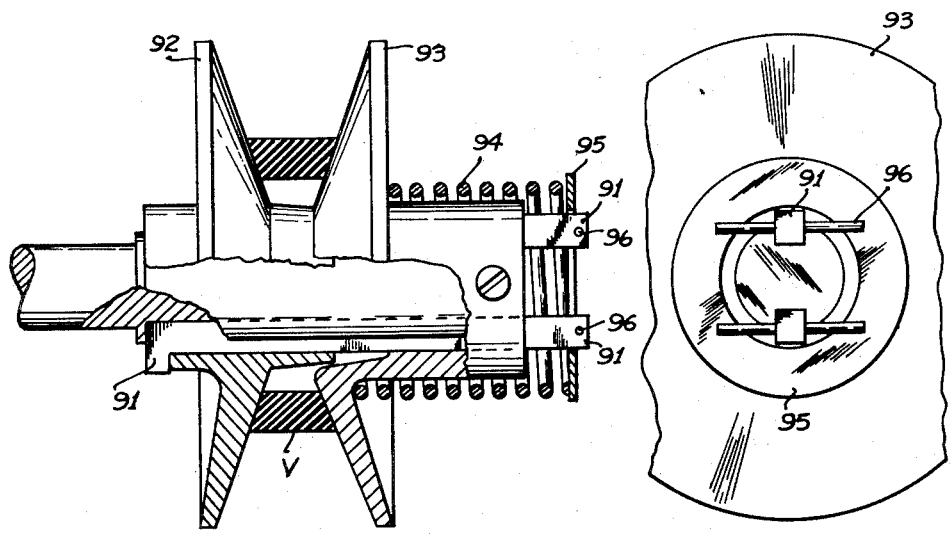
Figure 8 is an enlarged view similar to Figure 6, and Figure 9 a view similar to Figure 7, showing details of construction of the cooperating spring-loaded, two-part pulley which in some arrangements cooperates with the governor.

No means to return the governor arms to their position of rest, the full-line position of Figure 6, has been shown in Figures 1 and 2, for example, except that the unbalanced weight of the motor M provides that restoring force. A spring might act to that end and might be embodied within the governor itself, or in the arrangements shown in Figures 4 and 5, and in Figure 8, the spring is incorporated as part of a complemental two-part pulley assembly mounted upon the opposite shaft to the governor-mounting shaft.

In such an arrangement, the purpose of which will be pointed out hereafter, the pulley which corresponds to the pulley 9 is made up of two halves 92 and 93, both keyed upon their shaft, as by the key 91, to rotate conjointly therewith, but to slide relatively axially thereupon. Preferably the half 93 is held against axial movement, and in the relative arrangement suggested by Figures 6 and 8 a connecting belt will always remain straight. A spring 94 acting between the pulley half 93 and a washer 95, held by pins 96 to the keys 91, or any equivalent arrangement, serves to urge the pulley halves 92 and 93 toward one another, or into the position of maximum radius of bearing for the belt V. In this respect, the forces, other than centrifugal forces, acting upon the pulley 92, 93 are the opposite to those acting upon the pulley 2, 3. In effect, the spring 94, acting through a connecting belt, resists approach of the pulley halves 2 and 3.

In the normal position of rest, such as is shown in full lines in Figure 6, the primary weight masses 10, being already spaced from the rotative axis, are acted upon by centrifugal force as the rotation of the shaft commences, and as soon as centrifugal forces acting thereon overcome the opposing force they are swung outwardly. The supplemental weight masses 11 may be so arranged that their center of mass lies close to or in the rotative axis. Indeed, in some cases the center of mass of these auxiliary weight masses 11 might be at the opposite side of the rotative axis from the center of mass of the primary weight masses 10. This is simply a matter of design and weight distribution. If the design were such that the center of mass of the weight of the secondary weight masses 11 lies at the opposite side of the rotative axis from the center of mass of the primary weight masses 10, then the centrifugal effect upon the secondary weight masses would tend to counteract the centrifugal effect upon the primary weight masses. In all cases, however, the centrifugal effect upon the primary weight masses would serve to swing the governor arms 1 outwardly. The primary weight masses 10, in any ordinary design, would exert the far greater initial force. Increasingly, however, as the secondary or supplemental weight masses 11 swing outwardly, their centrifugal effect increases, in ratio to that of the primary weight masses 10. When the primary weight masses 10 have substantially reached the outward limit of their swing, so that a very material increase in centrifugal force would be required to effect appreciable further swing, the centrifugal effect of the secondary weight masses 11 is just building up to a point where they have an appreciable effect upon the governor arm combination as a whole. The result is that as the outward swing proceeds (as it does very rapidly, once started) the centrifugal effect on the supplemental weight masses 11 continues to build up to such a degree as to assume the primary effect in producing further swinging of the governor arms 1, and thrust axially of the governor shaft. The primary weight masses 10 then cease to have controlling importance, and control passes to the supplemental weight masses 11, since their centers of mass have not been swung outwardly to the full possible extent, and they have an appreciably greater lever arm to effect further outward swinging.

The net result is that the governor arms, being held against outward swing by a resisting spring force or the like, swing rapidly outward when that resistance is overcome, and assume an outwardly swung position, characteristic to that speed and resisting force, which is a resultant of the centrifugal effect upon the primary weight masses 10, in positions close to their outwardly swung limits, and of the centrifugal effect upon the secondary weight masses 11, which have not yet reached, but are being urged towards, their outwardly swung limits. For any given rotative speed and resisting force the arms reach a position from which they vary but little, for the greater lever arm and residual centrifugal effect upon the secondary weight masses 11 tends to respond quickly to any change of speed.

Moreover, the system is subject to a wide range of design variation, by designing the relative masses 10 and 11 in accordance with any desired result; or variation in results may be produced by effecting adjustment of parts of one or both such masses, as is shown in Figure 11, where the element 13, having the stem 14, is adjustable inwardly or outwardly with respect to the fulcrum of the governor arm 1, and is held in any adjusted position by the set screw 15.

In one installation of this general type, with the governor mounted upon the driven shaft, the driving shaft was varied from 1000 R. P. M. to 3600 R. P. M. With constant load, the driven shaft remained at 1750 R. P. M., plus or minus 50 R. P. M. With change of load, the value of the constant speed may shift slightly, but that value remains constant throughout just such a range.

The installation of Figures 1 and 2 has the governor on the driven shaft B, and opposes the governor-produced thrust by the uncounter-balanced weight of the motor M; the pulley 9 is a solid pulley. The installation of Figure 3 differs therefrom principally in that the motor M is immovably supported, and the governor's thrust is opposed by the belt-tightener T. The installation of Figures 4 and 5 may be considered as the equivalent of those previously referred to, or it may be considered as a reversed installation, depending upon which shaft is the driving and which is the driven shaft; it differs from the earlier-described installations primarily in that the governor's thrust is opposed by the force of the spring 94 acting upon the split pulley 92, 93. Figure 12 illustrates a transmission unit, capable of installation by connecting either of the shafts A or B to a source of power, and the other to the load, and in which the maintenance of constant speed of the driven shaft, or the application of load most favorably to the driving shaft, will depend only upon whether the shaft A or the shaft B, respectively, is the driven shaft.

In Figure 13 the arrangement is a reversal of that of Figures 1, 2, and 3, in the sense that the governor is mounted upon the driving shaft A of motor M. The pulley 9 on the driven shaft B might be a solid pulley as shown, in which case the governor's thrust is opposed by the weight of the motor M, or a split, spring-loaded pulley, as in Figures 8 and 9, might be substituted therefor. At L is shown a limit switch, in the circuit of motor M.

In position of rest the motor support F would assume the dot-dash line position, resting upon the switch L and thereby opening the motor circuit, or otherwise breaking the transmission of power. Upon closing the motor circuit (as by a by-pass or shunt circuit around the switch L) the motor armature rotates, and as its speed approaches full speed the governor arms swing outwardly, causing the pulley halves 2, 3 to approach one another, and urging the belt's bearing circle radially outwardly. The governor will promptly develop such thrust, due to the centrifugal effect on the primary balls 10, that the belt will support the motor above the switch L. Initially, as the belt begins to transmit torque to the driven shaft B, this belt will lie closer to the rotative axis of the driving shaft A than in a later stage of the drive, in which later stage the somewhat higher speed of the driving shaft A will have urged the belt radially farther outward upon the pulley 2, 3. If the motor be immovable, and the pulley on the driven shaft B be a split, spring-loaded pulley, the belt will initially bear farther from its rotative axis than at a later stage when the radially outward movement of the belt on the pulley 2, 3 squeezes apart the pulley halves 92, 93. In such initial stages, then, the mechanical advantage of the driving shaft over the driven shaft is so much greater than at a later stage, and the speed of the driving shaft is so much greater, relatively, than the speed of the driven shaft, that the torque can be most favorably applied, without danger of stalling or decreasing unduly the speed of the driving motor. As the latter's speed increases, but only as it increases beyond the critical minimum speed, the mechanical advantage of the driving shaft over the driven shaft rapidly decreases, with the result that the driven shaft smoothly picks up speed, yet without loss of speed in the driving shaft, until the transmission is stabilized at the predetermined speed. Should the load decrease, the ensuing shifting of the secondary weight masses 11 inwardly to less than their fully outwardly swung position permits the driving shaft to speed up momentarily, increasing the bearing radius of the belt upon the pulley 2, 3, and decreasing the drive ratio of the driving to the driven pulley, and speeding up the driven shaft, again stabilizing the relative speeds of the two shafts at a value such that there is little variation in speed in the driving shaft. The same factors operate, though reversely, to the same end, should the load increase; only if the load becomes so great as to threaten to stall the motor M will the governor effect rapid separation of the pulley halves 2, 3 so as to separate the pulley halves beyond driving connection, or to let the motor, as a safety factor, drop into contact with the switch L, opening the motor circuit.

Thus the invention is valuable as a transmission with the governor upon the driving shaft, or as previously explained, with the governor upon the driven shaft but to a somewhat different end. Since the spring 94 acts indirectly to resist separation of the pulley halves 2, 3, a more directly acting yieldable resistance may be employed, upon the governor shaft, and the movable element of the governor, as the element 2, may be more directly connected to operate a motor control, whereupon the governor becomes, in its general arrangement, a conventional governor with increased sensitivity.

We claim as our invention:

1. A rotative governor comprising two collars interconnected for conjoint rotation and for relative axial movement, means resiliently resisting such relative axial movement, a control element connected for operation in accordance with the relative axial disposition of said collars, and means to effect such relative axial movement, in opposition to said resisting means, including symmetrically disposed angled arms fulcrumed at one end about transverse axes upon one of said collars, each arm extending, in position of rest, generally parallel to the rotative axis and then inwardly towards such rotative axis to locate its center of mass, in position of rest, close to the rotative axis, said arm being likewise operatively connected to the other collar, for control of the collars' relative axial disposition according to the outward swing of said arms.

2. A rotative governor comprising two collars interconnected for conjoint rotation and for relative axial movement, means resiliently resisting such relative axial movement in one sense, a control element connected for operation in accordance with the relative axial disposition of said collars, symmetrically disposed arms each fulcrumed at one end upon one of said collars, extending thence lengthwise the rotative axis, and then inwardly past the rotative axis and past one another, to dispose their center of mass, when at rest, close to the rotative axis, and each operatively connected to the other collar to effect relative axial movement of the collars, in opposition to said resisting means, in accordance with outward swing of the arms.

3. A rotative governor comprising two collars interconnected for conjoint rotation and for relative axial movement, means resiliently resisting such relative axial movement in one sense, and tending to retain parts in position of rest, a control element connected for operation in accordance with the relative axial disposition of said collars, two diametrically oppositely disposed arms each fulcrumed at one end upon one of said collars, and operatively connected to the other to effect their relative axial movement, in opposition to said resisting means, as the arms swing outwardly from position of rest, each arm extending from its fulcrum generally lengthwise the rotative axis, and then inwardly past such rotative axis, and each being symmetrically disposed with reference to a plane through the rotative axis and normal to its fulcrum axis.

4. A rotative governor comprising two collars interconnected for conjoint rotation and for relative axial movement, means resiliently resisting such relative axial movement in one sense, and tending to retain parts in position of rest, a control element connected for operation in accordance with the relative axial disposition of said collars, two diametrically oppositely disposed arms each fulcrumed at one end upon one of said collars, and operatively connected to the other to effect their relative axial movement, in opposition to said resisting means, as the arms swing outwardly from position of rest, each arm extending from its fulcrum generally lengthwise the rotative axis, and then inwardly past such rotative axis, and each being symmetrically disposed with reference to a plane through the rotative axis and normal to its fulcrum axis, one such arm being bifurcated, and the other interfitting between the furcations of the first.

5. A rotative governor as in claim 3, wherein the mass of each arm is so distributed that its center of mass lies inside the free end of the opposite arm.

6. A rotative governor as in claim 3, wherein the flyball upon the lengthwise branch of each arm is of mass in excess of the mass of the inwardly directed branch of such arm.

WILLIAM MORTON.
ROBERT W. HERMANSON.

REFERENCES CITED

The following references are of record in the file of this patent:

UNITED STATES PATENTS

| Number | Name | Date |
| --- | --- | --- |
| 112,058 | Lynde | Feb. 21, 1871 |
| 317,850 | Prusmann | May 12, 1885 |
| 778,249 | Junggren | Dec. 27, 1904 |
| 831,563 | Masher | Sept. 25, 1906 |
| 984,439 | Olin | Feb. 14, 1911 |
| 1,094,986 | Falk | Apr. 28, 1914 |
| 1,410,463 | Funk | Mar. 21, 1922 |
| 1,484,145 | Massey | Feb. 19, 1924 |
| 2,158,367 | Henney | May 16, 1939 |
| 2,294,777 | Heyer | Sept. 1, 1942 |
| 2,356,772 | Magee | Aug. 29, 1944 |
| 2,378,549 | Gruenhagen | June 19, 1945 |

FOREIGN PATENTS

| Number | Country | Date |
| --- | --- | --- |
| 396,486 | Germany | June 13, 1924 |